(No Model.)

J. A. HAMILTON.
FASTENING AND STOP FOR GAS COCKS, &c.

No. 559,173. Patented Apr. 28, 1896.

WITNESSES:
Fred White
Thomas F. Wallace

INVENTOR:
John A. Hamilton,
By his Attorneys,
Arthur E. Fraser & Co.

UNITED STATES PATENT OFFICE.

JOHN A. HAMILTON, OF NEW YORK, N. Y.

FASTENING AND STOP FOR GAS-COCKS, &c.

SPECIFICATION forming part of Letters Patent No. 559,173, dated April 28, 1896.

Application filed July 2, 1895. Serial No. 554,764. (No model.)

*To all whom it may concern:*

Be it known that I, JOHN A. HAMILTON, a citizen of the United States, residing in the city, county, and State of New York, have invented certain new and useful Improvements in Fastenings and Stops for Gas-Cocks or other Rotative Plugs, of which the following is a specification.

This invention relates to ground-cocks and gas-cocks, joints, or like devices in which a plug is mounted in a socket in which it has a limited rotative movement; and the invention aims to provide an improved stop for limiting the movement of such plugs and an improved fastening for maintaining the plug in the socket.

Heretofore, in gas-cocks particularly, a radial pin has been set in the plug, and by acting against a shoulder on the socket-piece has served as a stop. In practice there is danger of loosening and escape of this pin under the influence of the repeated strains it receives as it strikes the shoulder. One feature of my invention resides in a substitute for this pin which shall be free from the danger of escape heretofore existing.

Prior to my invention much difficulty has been experienced in securing rotative plugs, and particularly those of gas-cocks, in position in the socket-pieces in such manner that they may be easily adjusted and securely locked against escape. The most common fastening employed consists of a washer moving with the plug and bearing on the socket-piece and a screw entering the end of the plug and engaging this washer to draw the plug through the socket-piece. It is found that a slight looseness between the washer and plug is unavoidable in practice, and that the resulting relative movements of the parts in operation may loosen the screw and thus impair the tightness of the fastening.

One feature of my invention aims to provide a fastening certain in its operation and capable of ready adjustment. In carrying out this feature of my invention I preferably provide upon the end of the plug a screw-thread and a worm-gear near said thread, and I provide a collar or nut screwing on said thread and embracing the socket-piece, and I provide a screw-threaded spindle or lock on said collar engaging said gear, which spindle, when rotated, drives the collar around the plug, and thereby screws it toward or from the socket-piece for adjustment, and when stationary locks the collar against movement on the plug, and I provide said spindle with a lock-nut or other means for preventing its escape from the collar and its accidental movement therein.

Figure 1:
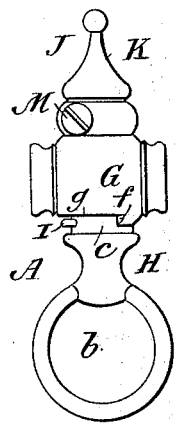
Figure 2:
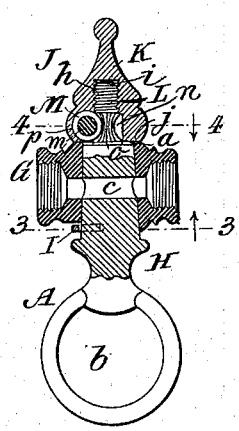
Figures 3, 4:
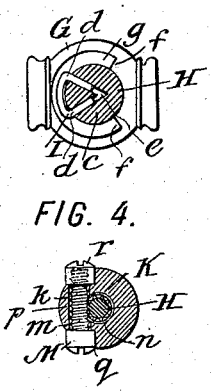
Figure 5:
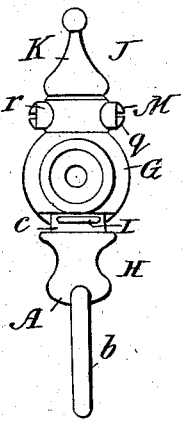
Figure 6:
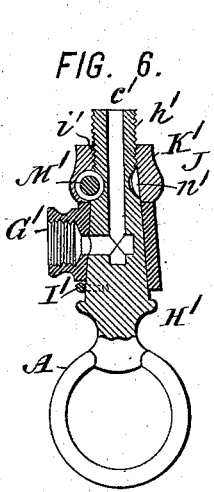
Figure 7:
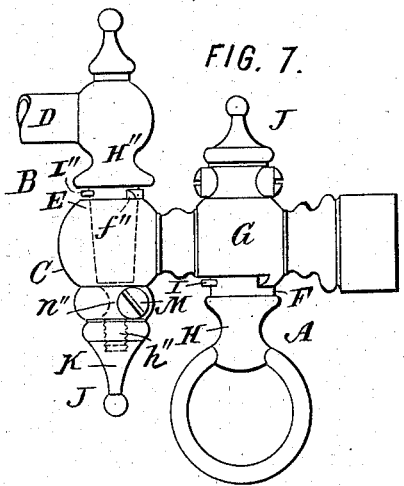
Figure 8:
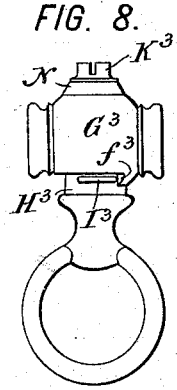
Figure 9:
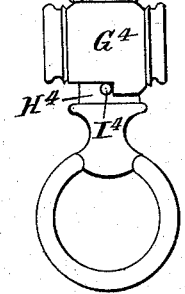

In the accompanying drawings, which illustrate certain adaptations of my invention as applied to the plugs and joints of gas cocks and fixtures, Figure 1 is a side elevation of a gas-cock embodying both features of my improvement. Fig. 2 is a similar view showing the socket-piece, plug, and fastening partly in axial mid-section. Fig. 3 is a cross-section of the plug cut on the line 3 3 in Fig. 2 and looking upwardly. Fig. 4 is a cross-section of the plug and fastening cut on the line 4 4 of Fig. 2 and looking downwardly. Fig. 5 is an elevation of the gas-cock, looking from the left in Fig. 1. Fig. 6 is an elevation, partly in axial mid-section, showing an elbow gas-cock provided with my improvements. Fig. 7 is a fragmentary side elevation of a gas-fixture, the swivel-joint and cock of which are each provided with my improvements. Fig. 8 is a side elevation of an ordinary construction of gas-cock provided with my improved stop; and Fig. 9 is a side elevation of an ordinary construction of gas-cock provided with my improved fastening.

Referring to the drawings, let A indicate the cock as a whole; B, the gas-fixture or other tubular member of which it forms part; C, the wall member thereof; D, the movable arm thereof; E, the swivel-joint between the arm and wall member, and F the swivel-joint for the plug of the cock. These parts may be of any usual or suitable construction, those shown being in general of the ordinary construction, in which the socket-pieces are fixed members and the movable parts thereof are partially rotative plugs, all traversed by a duct or conduit through which gas or other fluid may flow.

Referring to Figs. 1 to 5, inclusive, I will first describe the preferred form of my improved stop when applied to the use for which it is most especially applicable—that is, to limit the relative rotative movement between the plug and socket-piece of the character generally used in cocks or bibs, such as gas-cocks. In these views the cock A consists of a socket-piece or body G, having a tapering socket $a$ and an axial bore or tubular interior, and a plug H, having usually a tapering shank $c$ entering and fitting this socket and having a diametric hole registering with the bore of the body and a finger-piece or other suitable part $b$ to be grasped by the finger. These parts are relatively movable, the plug being usually susceptible of rotation throughout one hundred and eighty degrees, and to limit this rotation opposing shoulders which act as stops are usually provided on the respective parts.

According to my improvements the shoulder or stop on the plug consists of a U-shaped piece I, consisting of a bent wire or staple having an arc-shaped body corresponding substantially in curve with the periphery of the adjacent portion of the plug and legs $d$ inwardly inclined and having side faces embracing opposing faces in the plug, and the plug is constructed with a socket $e$ receiving this piece, which socket preferably consists of two inclined bores, those shown being radial cylindrical bores, entering the shank $c$ at angles of substantially sixty degrees and meeting near the center of the plug, the diverging adjacent walls of which bores constitute undercut faces coinciding with and engaging the opposing faces of the piece I and preventing the escape of the latter. The legs $d$ are shown as a tight fit in the bores of the socket $e$ and of a length sufficient to approximately meet or pass at the inner end thereof when the piece I is driven with its central body against the periphery of the shank. In applying the piece to the shank the legs may be parallel, or substantially so, their ends entered into the outer ends of the bores, and then by a driving operation they will be distorted as they pass into the socket. When driven home, the piece can only be removed from the socket by the exercise of much force, and its connection with the plug is such that no loosening or escape can occur from the jars received in use. The opposite outer faces of the legs $d$ constitute the shoulders or stops for engaging the opposing shoulders $f$ of the body. These shoulders will be separated sufficiently to permit the requisite rotation of the plug. When this rotation is one hundred and eighty degrees, the distance between these shoulders must equal one hundred and eighty degrees plus the width of the piece I. The shoulders $f$ are formed, as usual, by the removal of a portion $g$ of the lower part of the body G.

Referring again to Figs. 1 to 5, inclusive, I will now describe the preferred form of that portion of my invention which has for its object the fastening of the plug in the socket. To accomplish this fastening it is usually desirable that there shall be opportunity for adjustment to draw the plug into the socket to take up wear, particularly when the plug is the tapered plug of a cock or tubular joint. In the construction shown my improved fastening, which as a whole is lettered J, consists of a nut, collar, or screw-threaded member K, separate from the plug, a reciprocal screw-threaded portion, as L, carried by the plug, and a locking-piece M, carried by one of these parts and engaging the other for preventing their relative displacement and effecting their relative adjustment. Preferably the plug H has a reduced end carrying a screw-thread $h$ and constituting the portion L of the fastening, and the member K is a nut having an internal screw-threaded portion $i$ fitting the screw-thread $h$ of the plug. As the nut K screws on the thread $h$ its inner face $j$ embraces the adjacent face of the body G and draws the plug home in the socket, holding it then in position until the nut is subsequently adjusted. To prevent accidental adjustment of the nut, according to my invention, I provide the locking device M, which is preferably carried by the nut and has faces or shoulders engaging corresponding faces or shoulders on the portion L of the plug, and thereby preventing relative movement of the parts. Preferably the faces or shoulders on the lock M consist of screw-threads $k$, formed on a spindle $m$, and the reciprocal faces on the part L consist of teeth or worm-gear faces $n$, formed on a neck $o$ of the plug, between its body and the thread $h$, and the lock M is rotatively mounted in a socket $p$ in the nut K, extending at right angles to the axis of the plug and disposed sufficiently at one side of this axis to present the threads $k$ of the lock in proper engagement with the teeth $n$ of the neck $o$. Thus by rotating the lock M the engagement between its thread and the teeth of the gear will cause the nut to travel around the plug. By the former the nut can be adjusted on the plug, and by the latter it can be locked in position.

To facilitate the rotation of the lock; it is provided with a notched head $q$, seating in a corresponding socket in the nut and adapted to receive a screw-driver or other manipulating tool. To prevent the displacement of the lock, it is formed on its opposite end with some suitable head or shoulder which by working against the face of the nut will prevent the lock from moving endwise. This is preferably constructed as a screw-head or cap-nut $r$, screwing tight on its end opposite the head $q$. This should leave the lock free to turn; but by making the shank of the lock slightly shorter the nut $r$ may tighten against the face of the socket in the nut K, and thereby serve to fix the lock when properly adjusted.

In operation the nut K is screwed upon the plug until its end embraces the face of the socket-piece or body and the plug has been drawn into the socket to the desired position, or until the desired extent of frictional fit has been attained. Then the lock M is applied in the construction shown by inserting its screw-threaded shank into the socket $p$ and rotating it so that its screw-threads will engage the gear $n$ and propel it through the socket until its head $q$ is firmly seated in the corresponding recess in the nut. Then the opposite head or nut $r$ will be screwed onto the end of the lock M until it is tight thereon, whereupon the lock will be held against displacement. The engagement of its screw-threads with the teeth of the gear $n$ will prevent any relative rotative movement between the nut and plug, and consequently there will be no opportunity for unscrewing of the nut as the plug is turned in use. Such unscrewing, unless thus resisted, would be liable to occur by reason of the frictional contact between the nut and socket-piece; but with the lock M there is practically no tendency to loosen or unscrew, since there are no points of contact between it and the nut and plug which in ordinary use have any relative movement.

To readjust the nut on the plug it is only necessary to turn the lock, whereupon its screw-threads, meshing with the gear $n$, will drive the nut around on the plug in either direction, according to the direction of rotation of the lock. If it becomes necessary to remove the lock, its fastening or nut $r$ is first unscrewed, and then the shank of the lock is screwed out of engagement with the gear $n$, whereupon it may be removed. The reverse operation suffices to replace it.

I prefer to employ screw-drivers for manipulating the lock and its nut $r$; but they may be constructed to be manipulated in any other known or suitable manner.

It will be seen that my invention provides improvements in stops and fastenings for rotative plugs which are simple and effective and which can be variously and advantageously availed of, and it will be understood that the invention is not limited to the particular details of construction, combination, and use hereinbefore set forth, but that, on the contrary, the improvements may be availed of in whole or in part according to such modifications as circumstances or the judgment of those skilled in the art may dictate without departing from the spirit of the invention.

In Fig. 6 I have shown my improvements as applied to a tubular plug such as used in an elbow gas-cock. Here the plug (lettered H') has a conduit $c'$ within its screw-thread $h'$ and gear $n'$, and the nut K is tubular, having a screw-thread $i'$ engaging the screw of the plug, and beneath this thread carrying the lock (lettered M') engaging the gear $n'$. The lower edge of the nut bears on top of the socket-piece or body G'. At the opposite side of the body the plug carries my improved stop, (lettered I'.)

In Fig. 7 the body G, plug H, stop I, and fastening J of the cock A are of the same construction as described with reference to Figs. 1 to 5; but in this figure my improved stop and fastening are also shown as applied to the swivel-joint E between the wall member C and the movable arm D of the fixture B. With this construction the wall member C is a socket-piece, and the arm D has a plug H'' fitting and rotating in the socket of the member C and having on its lower end a screw-thread $h''$ and a gear $n''$. A nut K and a lock M, identical in construction with those before described with reference to Figs. 1 to 5, are applied to the lower end of this plug, engaging, respectively, its screw-thread and gear and serving to prevent upward displacement of the plug relatively to the member C. To limit rotation of the plug, it is provided at its upper end with my improved stop, (here lettered I'',) which engages a shoulder (lettered $f''$) on the member C.

The gas-cock shown in Fig. 8 is the ordinary plug, (lettered H$^3$,) held in position in the usual socket-piece G$^3$ by the ordinary screw K$^3$, acting against a washer N. At its lower end the plug is provided with my improved stop, (lettered I$^3$,) which acts against a shoulder $f^3$ on the body G$^3$.

The construction shown in Fig. 9 is an ordinary gas-cock provided with my improved fastening for the plug. The plug (here lettered H$^4$) has the usual stop-pin I$^4$ at bottom, but at top it is provided with my improved fastening J, which in construction is identical with that described with reference to Figs. 1 to 5 and bears on the upper side of the socket-piece G$^4$, as explained with reference to said construction. The nut $r$ is shown as a cap-nut, so that if it seats on the end of the spindle $m$ before it sets against the nut K it will simply hold the lock M axially.

What I claim is—

1. In rotative cocks, the combination with a socket-piece having a socket and a shoulder, of a rotary plug entering the socket in said piece and having diverging lateral holes, and a stop for said plug consisting of a U-shaped piece of metal having a body embracing the periphery of said plug, rotating therewith, and having diverging legs entering said holes and thereby holding said stop on said plug.

2. In rotative cocks and the like, the combination with a socket-piece, of a plug rotatively fitting said socket-piece, having a screw-thread, and projecting faces, and a nut having a screw-thread engaging that of said plug and when screwed thereon fastening said plug in said socket-piece, and a rotative lock carried by said nut having threads engaging the faces of said plug and thereby preventing relative movement of said nut and plug when the lock is stationary, and when rotated rotating said parts, and a screw-threaded fastening for said lock, substantially as and for the purpose set forth.

3. In fastenings for rotative plugs and the like, a socket-piece having a socket, in combination with a plug rotatively fitting said socket, having a male screw-thread and projecting teeth, and a nut having a female screw-thread engaging that of said plug, and when screwed thereon retaining the latter in said socket, and a rotative lock carried by said nut and having faces engaging the teeth of said plug and thereby preventing relative rotation of said plug and nut.

4. In fastenings for rotative plugs and other devices, a socket-piece having a socket, in combination with a plug having a screw-thread and a worm-gear, a nut having a thread engaging that of said plug and screwing thereon to fasten said plug in position, and a rotative lock carried by said nut and having a screw-thread engaging said worm-gear, whereby by rotating said lock said nut and plug can be relatively adjusted.

5. In fastenings for rotative plugs and the like, the combination with a socket-piece having a socket, of a plug fitting said socket rotatively, having a screw-thread and projecting faces, in combination with a nut screwing on said thread and holding said plug in said socket, a lock carried by said nut having threads engaging the faces of said plug and preventing relative rotation of the plug and nut and when rotated rotating said parts, and a rotative fastening for said lock holding the latter in position.

6. In fastenings for plugs and the like, a socket-piece having a socket, in combination with a plug rotatively fitting said socket and having a screw-thread $h$ and teeth $n$, and a nut K having a thread $i$ screwing on the thread of said plug to hold the latter in position, and having a transverse hole $p$ opposite said teeth and recesses at the ends of said hole, and a lock M having a screw-threaded shank $m$ in said hole and engaging the teeth of said gear, a head $q$ in one of said recesses, and projecting at its other end in the other of said recesses, and a nut $r$ screwing on the projecting end of said shank, seating in the other of said recesses, and retaining said lock in position, substantially as and for the purpose set forth.

7. In gas-cocks and like devices, a socket-piece G having a socket $a$, and a shoulder $f$, in combination with a plug H fitting in said socket, having diverging holes at its end near said shoulder, a screw-thread and projecting teeth at its other end, a stop I consisting of a U-shaped wire having legs entering said holes, and a body projecting in the line of said shoulder, a nut K screwing on said screw-thread, and a lock M carried by said nut and engaging said teeth, all combined and arranged substantially as and for the purpose set forth.

8. In fastenings, a socket-piece having a socket, in combination with a member fitting said socket, having a screw-thread and projecting teeth, said parts rotative the one relatively to the other, and a nut having a screw-thread engaging that of said member, and when screwed thereon retaining the latter in said socket, and a rotative lock carried by said nut and having faces engaging the teeth of said member and thereby preventing relative rotation of said member and nut when stationary, and when rotated rotating said parts.

In witness whereof I have hereunto signed my name in the presence of two subscribing witnesses.

JOHN A. HAMILTON.

Witnesses:
ARTHUR C. FRASER,
FRED WHITE.